United States Patent

Fukuzawa et al.

[11] Patent Number: 5,394,432
[45] Date of Patent: Feb. 28, 1995

[54] LEVITATING AND FUSING DEVICE

[75] Inventors: Akira Fukuzawa; Kazuyuki Sakuraya; Toshiaki Watanabe, all of Tokyo; Motoo Yamazaki, Hamamatsu; Tadashi Morita, Kawasaki; Tatsuo Take, Kawasaki; Michiru Fujita, Kawasaki, all of Japan

[73] Assignees: National Research Institute for Metals, Tokyo; Chubu Electric Power Company, Inc., Aichi; Fuji Electric Co., Ltd., Kanagawa, all of Japan

[21] Appl. No.: 992,943

[22] Filed: Dec. 17, 1992

[30] Foreign Application Priority Data

Dec. 20, 1991 [JP] Japan .................. 3-337325

[51] Int. Cl.6 .............................. H05B 6/22
[52] U.S. Cl. .................. 373/156; 373/139; 373/146
[58] Field of Search ............ 373/158, 138, 142, 146, 373/151, 155, 156, 139; 75/10 R, 10.14, 10.15

[56] References Cited

U.S. PATENT DOCUMENTS

| | | | |
|---|---|---|---|
| 1,943,802 | 1/1934 | Northrup | 373/146 |
| 4,432,093 | 2/1984 | Reboux | 373/157 |
| 4,437,885 | 3/1984 | Bolze | 75/10 R |
| 5,090,022 | 2/1992 | Mortimer | 373/156 |
| 5,280,496 | 1/1994 | Schlecth et al. | 373/158 |

FOREIGN PATENT DOCUMENTS

2-287091  11/1990  Japan .

Primary Examiner—Bruce A. Reynolds
Assistant Examiner—Tu Hoang
Attorney, Agent, or Firm—Finnegan, Henderson, Farabow, Garrett & Dunner

[57] ABSTRACT

A plurality of segments 12 respectively formed of an electrically insulated conductive material such as copper or the like are disposed inside an induction coil 1 in the peripheral direction of the induction coil 1 to thereby construct a crucible 3. There is formed a small cylindrical hole 4 in the center of the bottom portion of the crucible 3. A magnetic flux is allowed to enter the crucible 3 from slits 15 respectively formed between the hole 4 and segments 12 and is then interlinked with an object to be heated. The slits 15 respectively defined by mutually adjoining segments 12 are arranged such that the width of the bottom portion thereof is greater than that of the cylindrical portion thereof. When the width of the slit in the bottom portion is increased, then a leakage flux to the crucible is increased which in turn increases a levitation force F. If there are further formed bottom slits only in the bottom portions of the segments to thereby increase the number of the slits in the bottom portion to be greater than that of the slits in the cylindrical portion, then the leakage flux is increased to thereby increase the levitation force F, and also the fused metal is supported at multiple points, which increases the stability S thereof.

10 Claims, 7 Drawing Sheets

LEVITATING AND FUSING DEVICE

BACKGROUND OF THE INVENTION

1. Field of the Invention

The present invention relates to a levitating and fusing device in which an object to be heated such as metal or the like is inserted into a crucible composed of a plurality of segments, each of which is formed of a conductive material, and disposed inside an induction coil, and the object to be heated is floated and is then fused in the levitating state thereof.

2. Description of the Prior Art

The metal that is fused according to a levitating and fusing method of the above-mentioned type is free from impurities contained in the crucible and, therefore, it can provide a fusion of high purity. Accordingly, by pouring the fused metal into a mold, a product of high quality can be manufactured. For example, the levitating and fusing method is applied to fuse titanium, silicone and the like.

Figure 13:
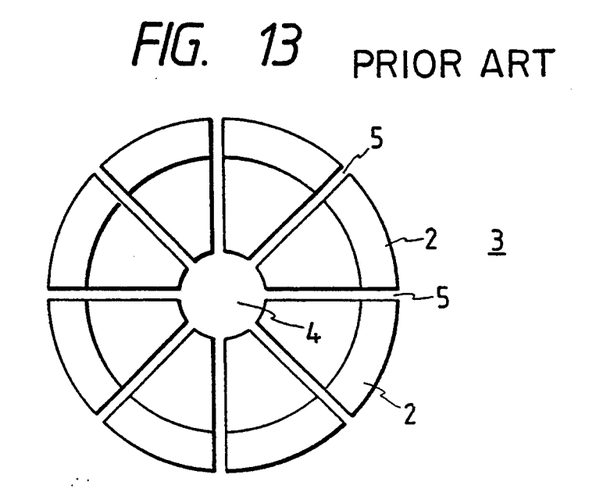
FIG. 13 is a plan view of a conventional crucible.
Figure 14:
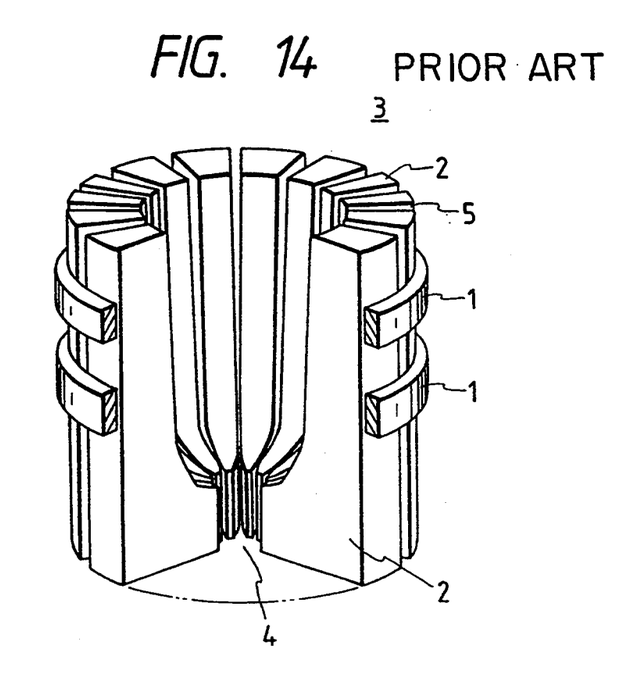
FIG. 14 is a partially sectional perspective view of the conventional crucible with a coil mounted thereto.

In FIG. 13, there is shown a plan view of a conventional crucible and, in FIG. 14, there is shown a partially sectional perspective view of the crucible shown in FIG. 13 and having coils mounted thereto. In these figures, according to a conventional levitating and fusing device, there are arranged inside circular induction coils 1 a plurality of segments 2 each formed of an electrically insulated conductive material such as copper and the like in the peripheral direction of the induction coils 1 to thereby construct a crucible 3. The inside of the crucible 3 is hollowed out to provide a cylinder with a bottom, into which cylindrical crucible 3 is inserted an object to be heated such as metal and the like. Also, in the center portion of the bottom of the crucible 3, there is opened up a small cylindrical hole 4. A magnetic flux is allowed to enter the crucible 3 from the hole 4 and slits 5 interposed between the adjacent segments 2 and is then interlinked with the object to be heated. The segments 2 are cooled by water or the like so that they cannot be heated.

A current flowing in the induction coils 1 induces an eddy current in each of the electrically insulated segments 2 and it also induces an eddy current in the object to be heated. Not only in the case where the object to be heated is a non-magnetic metal, but also in the case where it is a magnetic metal since the magnetic metal becomes a non-magnetic metal when it is heated up to a temperature equal to or higher than the Curie point, the directions of the eddy currents respectively flowing in the crucible 3 and the object to be heated are mutually opposite to each other in the opposing surface portions thereof and, therefore, there is generated a magnetic reaction force between the crucible 3 and the object to be heated. Since the crucible 3 is fixed, if a levitation force acting on the object to be heated is greater than the weight of the object to be heated, then the object to be heated is floated off from the crucible 3. The eddy current flowing in the object to be heated 6 generates heat due to ohmic loss to thereby be able to keep heating, so that the object to be heated can be fused in the levitating state thereof. However, with the conventional levitating and fusing device thus organized, it has been insufficient to float the fused metal with high energy efficiency and in a stable manner.

SUMMARY OF THE INVENTION

It is an object of the invention to provide a levitating and fusing device which can float the fused metal with high energy efficiency and in a stable manner so that the fused metal is uniformly agitated.

In attaining the above object, according to one aspect of the invention, there is provided a levitating and fusing device including a crucible disposed inside a induction coil and formed of a conductive material in the form of a cylinder with a bottom, in which the crucible is formed of a plurality of segments divided through slits in the peripheral direction thereof, and the leading ends of the bottom portions of the segments cooperate in defining an axial hole in the central portion of the crucible, characterized in that the slits respectively formed in the bottom portions of the segments are greater in width or in number than the slits respectively formed in the cylindrical portions thereof.

According to another aspect of the invention, there is provided a levitating and fusing device including a crucible disposed inside an induction coil and formed of a conductive material in the form of a cylinder having a bottom, in which the crucible is formed of a plurality of segments divided through slits in the peripheral direction thereof, and the leading ends of the bottom portions of the segments cooperate in defining an axial hole in the central portion of the crucible, characterized in that the induction coil is excited by a power source having a variable frequency.

According to still another aspect of the invention, there is provided a levitating and fusing device including a crucible disposed inside an induction coil and formed of a conductive material in the form of a cylindrical body having a bottom, in which the crucible is formed of a plurality of segments divided through slits in the peripheral direction thereof and the leading ends of the bottom portions of the segments cooperate in defining an axial hole in the central portion of the crucible, characterized in that the induction coil is divided into a plurality of coils to be respectively excited by separate power sources. In this case, a magnetic shield plate may be interposed between the divided induction coils, or the divided induction coils are excited in such a manner that the lower ones of the induction coils are excited at the lower frequencies or with the greater currents.

According to still another aspect of the invention, there is provided a levitating and fusing device including a crucible disposed inside an induction coil and formed of a conductive material in the form of a cylinder having a bottom, in which the crucible is formed of a plurality of segments divided through slits in the peripheral direction thereof and the leading ends of the bottom portions of the segments cooperate in defining an axial hole in the central portion of the crucible, characterized in that an inert gas is allowed to enter the crucible through the slit and to flow upwardly from the bottom of the crucible.

According to still another of the invention, there is provided a levitating and fusing device including a crucible disposed inside an induction coil and formed of a conductive material in a cylindrical body having a bottom, in which the crucible is formed of a plurality of segments divided through slits in the peripheral direction thereof and the leading ends of the bottom portions of the segments cooperate in defining an axial hole in the central portion of the crucible, characterized in that there is disposed rotary magnetic field generation means in the outer periphery of the crucible.

In a levitating and fusing device according to this invention, if the width of the slit in the bottom of the crucible is increased, then a leakage flux to the crucible is increased to thereby increase a levitation force. However, this causes increase of a difference between the force of the portion of a fused metal disposed near to the slit and receiving the levitation force and the force of the portion of the fused metal receiving very little the levitation force, thereby reducing a stability. If the number of slits is increased, then the leakage flux is increased to thereby increase the levitation force and the fused metal is supported at multiple points, thereby increasing the stability.

Also, in a levitating and fusing device according to this invention, the induction coil is excited by a power source having a variable frequency. In other words, at first, a low frequency is used to supply a high levitation force for a low stability to thereby facilitate the heating and fusion of a metal until the metal is fused. Once the metal is fused, if the power source is switched from the low frequency over to a high frequency to provide a high stability, then the metal can be fused well even if the levitation force is small. In this case, the power source having a variable frequency includes a plurality of power sources respectively having different frequencies from one another.

Further, in a levitating and fusing device according to this invention, if a lower induction coil is excited at a lower frequency or with a great current, then the lower induction coil can accelerate the levitating and heating of the metal while an upper induction coil can stabilize the fused metal. In this case, a magnetic shield plate may be disposed between the upper and lower induction coils to serve as a magnetic shield.

Still further, in a levitating and fusing device, if an inert gas is uniformly blown through the slit, then the fused metal is prevented from chemically reacting with the components in the air. Also, the provision of a rotary magnetic field generation means makes it possible to stir the fused metal very well and to provide a uniform composition for the fused metal.

DETAILED DESCRIPTION OF THE PREFERRED EMBODIMENTS

Preferred embodiments of the present invention will be described with reference to the accompanying drawings.

Figure 1:
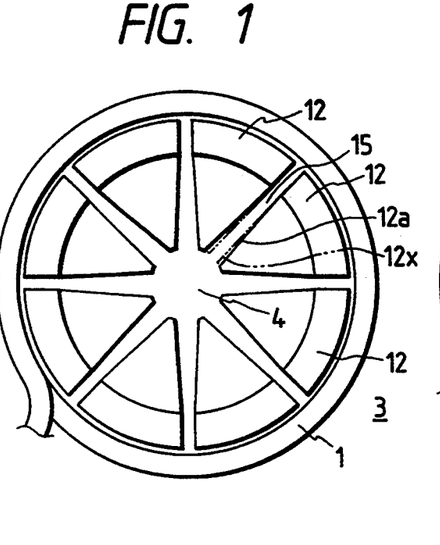
FIG. 1 is a plan view showing a crucible employed in a levitating and fusing device according to an embodiment of the invention.
Figure 2:
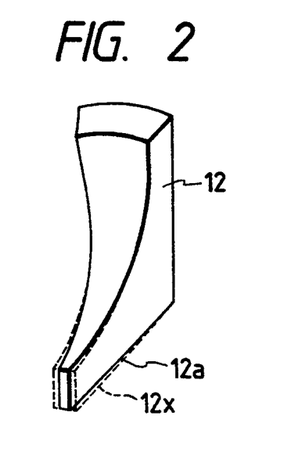
FIG. 2 is a perspective view showing a segment employed in the crucible of FIG. 1.
Figure 3:
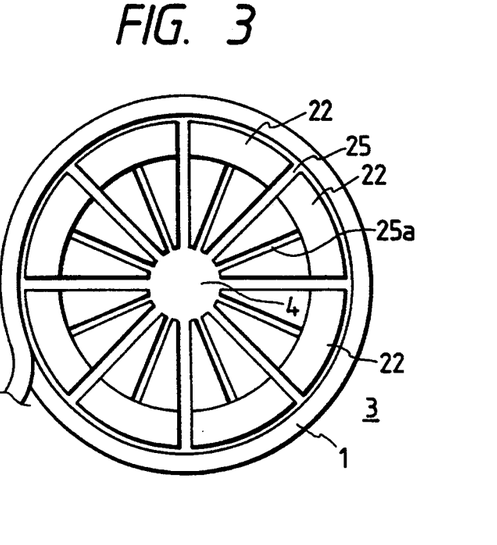
FIG. 3 is a plan view showing a crucible employed in a levitating and fusing device according to another embodiment of the invention.
Figure 4:
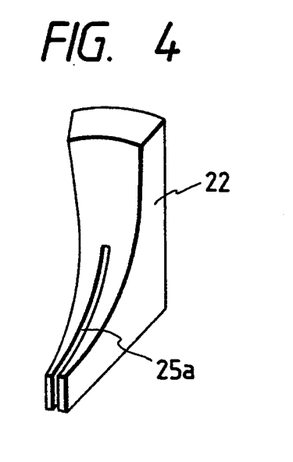
FIG. 4 is a perspective view of a segment employed in the crucible shown in FIG. 3.

FIG. 1 is a plan view of a crucible employed in a levitating and fusing device according to a first embodiment of the invention, and FIG. 2 is a perspective view of a segment employed in the crucible shown in FIG. 1. FIG. 3 is a plan view of a crucible employed in a levitating and fusing device according to a second embodiment of the invention, and FIG. 4 is a perspective view of a segment employed in the crucible shown in FIG. 3.

In FIGS. 1 and 2, a plurality of segments 12, each of which is formed of an electrically insulated conductive material such as copper and the like, are arranged inside a circular induction coil 1 and along the peripheral direction of the induction coil 1, thereby constructing a crucible 3. The inside of the crucible 3 is hollowed out to provide a cylinder with a bottom into which an object to be heated such as metal and the like is to be inserted. Also, in the central portion of the bottom of the crucible 3, there is formed a small cylindrical hole 4 and a magnetic flux is allowed to enter the crucible through the hole 4 and slits 15 formed between the adjacent segments 12 and is then interlinked with the object to be heated. The segments 12 are cooled by water or the like so as not to be heated.

In FIGS. 1 and 2, a side 12a in the bottom of each of the segments 12 adjoining each other and forming the slit 15 therebetween is formed narrower than a side 12x which is expected to form a parallel slit extending from the cylindrical portion of the segment to the bottom portion thereof, with the result that the slit 15 in the bottom portion of the segment 22 is greater in width than the slit 15 in the cylindrical portion thereof. On the other hand, in the crucible 3 shown in FIGS. 3 and 4, there is formed a bottom slit 25a in the bottom portion of each segment 22 and the number of the slits formed in the bottom portion of the segment 22 is greater than that of slits 25 formed in the cylindrical portion thereof.

Figure 7:
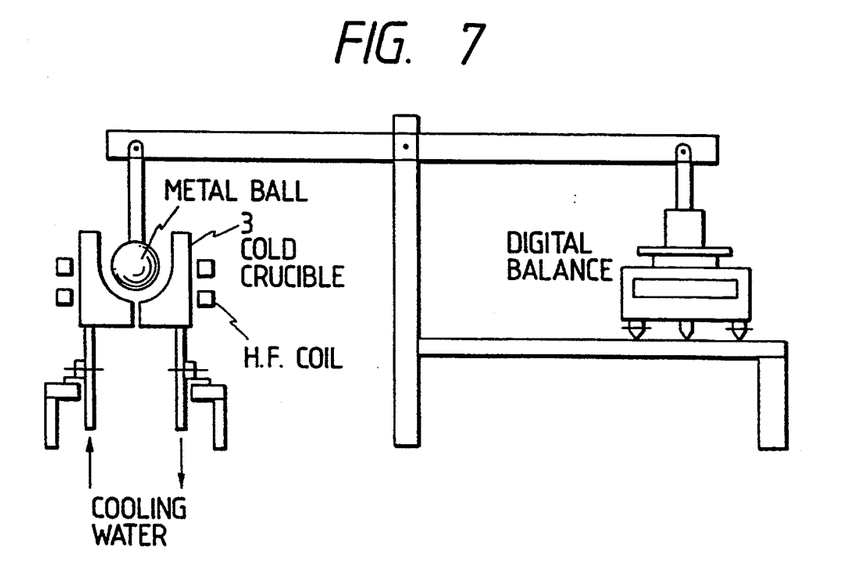
FIG. 7 is a front view of a concept of a device for measuring the levitation force F.
Figure 8:
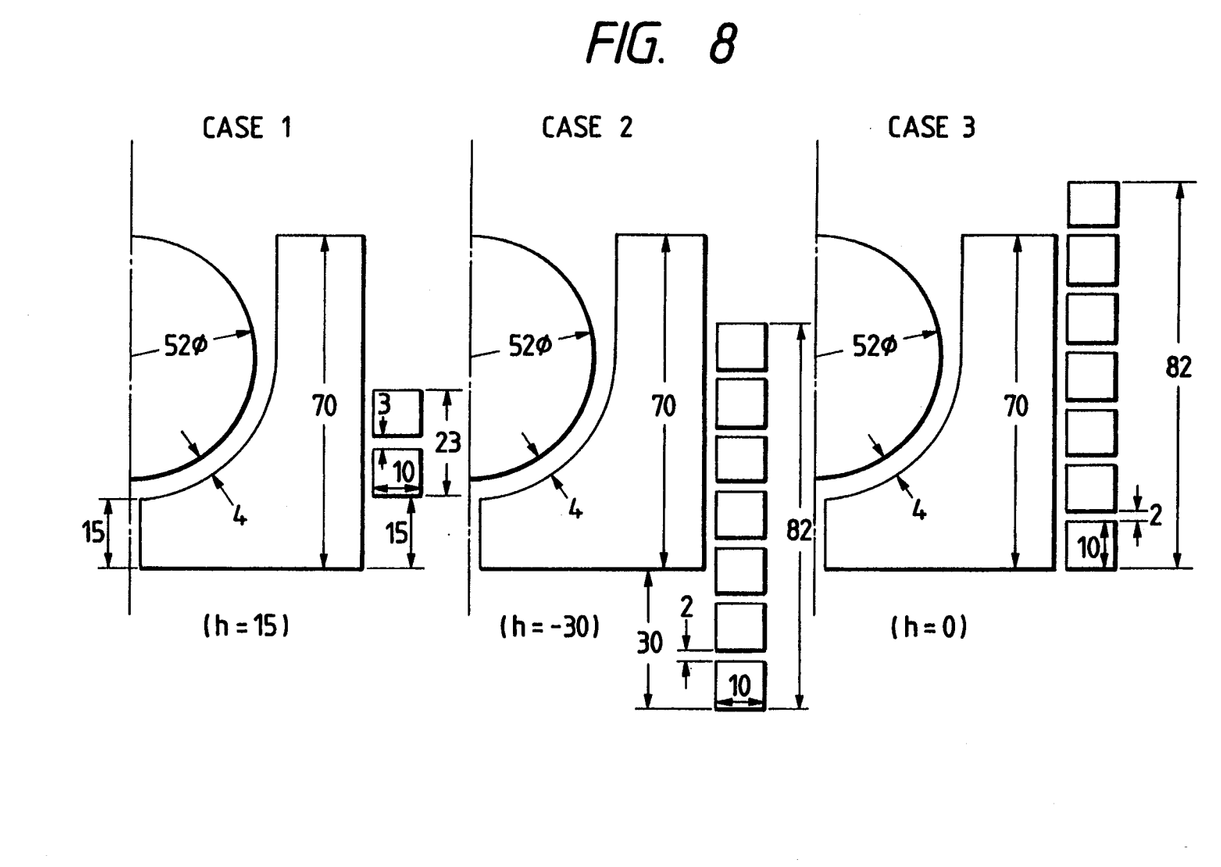
FIG. 8 is semi-section views of three cases, respectively showing a positional relationship between a crucible and a coil employed in the measuring device shown in FIG. 7.
Figure 9:
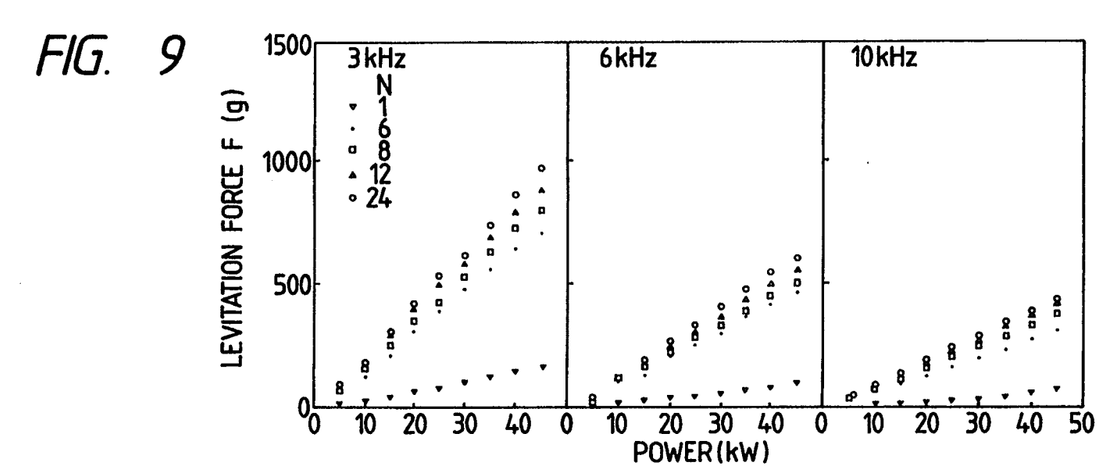
FIG. 9 is a characteristic view of the levitation force F using the number N of slits as a parameter in the case 1.
Figure 10:
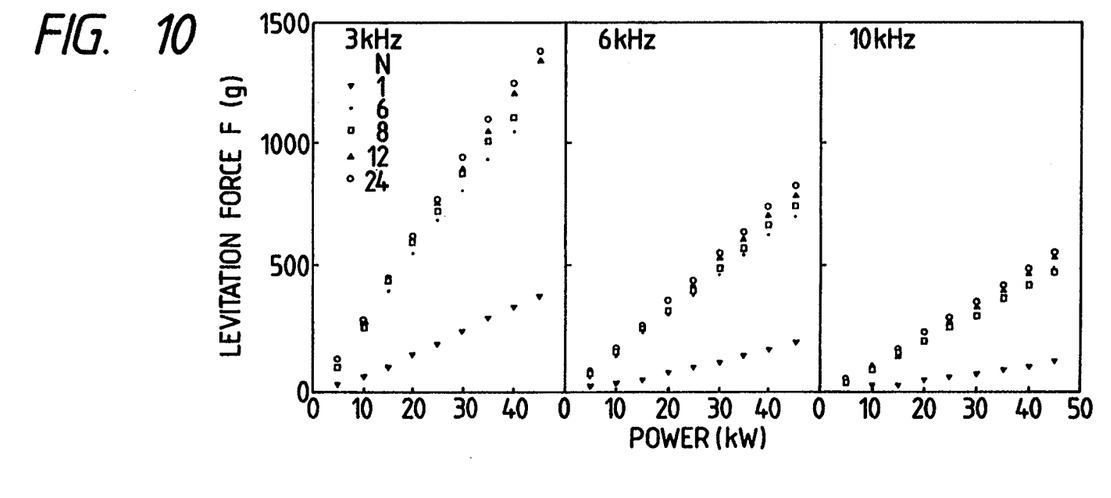
FIG. 10 is a characteristic view of the levitation force F using the number N of slits as a parameter in the case 2.
Figure 11:
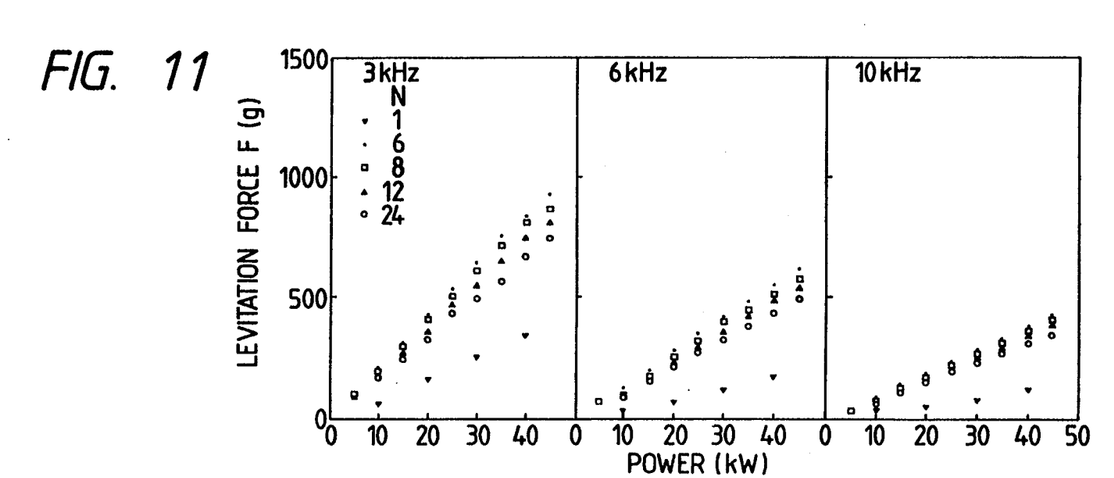
FIG. 11 is a characteristic view of the levitation force F using the number N of slits as a parameter in the case 3.
Figure 12:
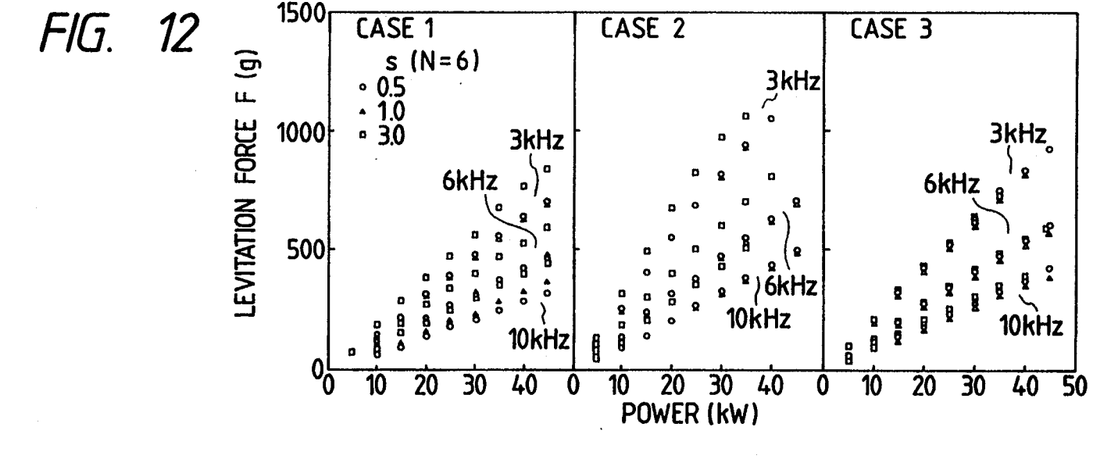
FIG. 12 is a characteristic view of the levitation force F using a slit width s as a parameter when N=6 in the case 3.

FIG. 6 is a graphical representation of the characteristics of the invention, that is, it shows conceptually, with the numerical values omitted, the characteristics representative of how the design factors of the levitating and fusing device affects the levitation force F and stability S of a fused metal. FIG. 7 is a conceptual front view showing a device for measuring the levitation force F. FIG. 8 is three semi-section views of three cases, respectively showing a positional relationship between a coil and a crucible respectively employed in FIG. 7. FIG. 9 is a characteristic view of a levitation force F in the case 1 of FIG. 8 using the number N of slits as a parameter, FIG. 10 is a characteristic view of a levitation force F in the case 2 of FIG. 8 using the number N of slits as a parameter, and FIG. 11 is a characteristic view of a levitation force F in the case 3 of FIG. 8 using the number N of slits as a parameter. FIG. 12 is a characteristic view of a levitation force F in the cases 1, 2 and 3 using the width s of slits as a parameter when the number of slits N=6. Numerical values shown in FIGS. 9 to 12 are all actually measured values. The levitation forces F shown in FIGS. 9 to 12 are arranged in FIG. 6. The stability S shown in FIG. 6 is obtained by visually observing, judging and examining the horizontal and vertical movements of a fused and levitated metal, the irregular flowing deformations of the surface of the fused metal, and how the fused metal in part touches the crucible and is cooled and solidified.

To measure the levitation force F, in a measuring device shown in FIG. 7, a copper ball of 52 $\phi$ is set in the crucible 3 and the levitation force F is measured by use of a digital balance. The positional relationship between the coil and crucible, as shown in FIG. 8, was checked in three cases, that is, when h=15, −30 and 0.

Figure 6A:
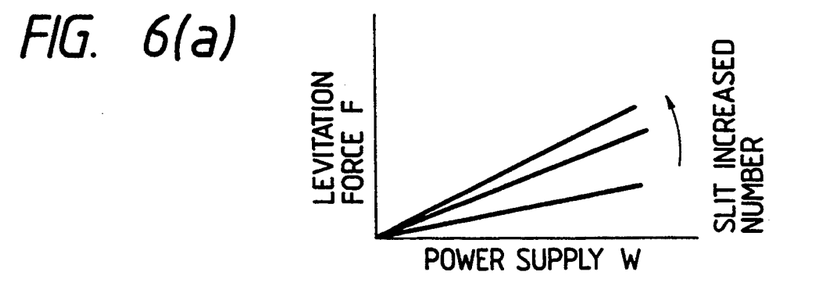
FIGS. 6(a) through 6(d) are graphical representations of the characteristics of the invention, showing what effects the design factors of the present levitating and fusing device have on the levitation force F and stability S of the fused metal.
Figure 6B:
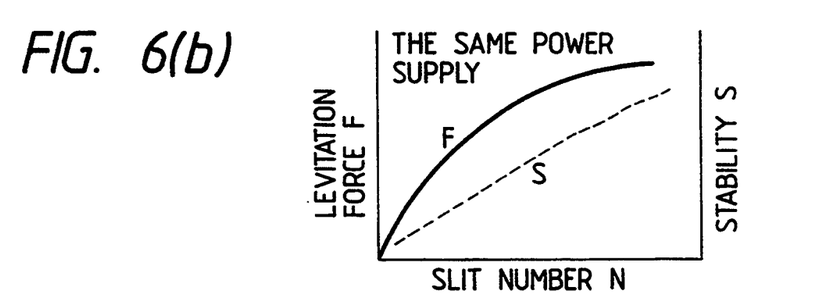
Figure 6C:
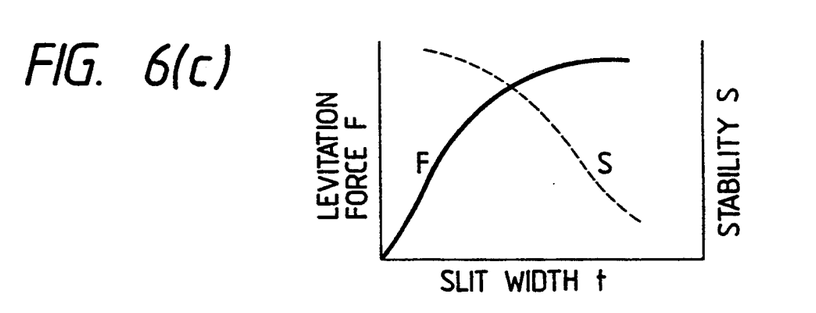

With further respect to the first and second embodiments, as shown in FIGS. 6(a) to 6(c), if the width of the slit formed in the bottom portion of the segment is increased, then the leakage magnetic flux to the crucible is increased to thereby increase the levitation force F. However, in the peripheral direction of the segment, this increases a difference in received force between a portion of a fused metal that is located adjacent to the slit so as to receive the levitation force F and a portion of the fused metal that hardly receives the levitation force F, thereby lowering the stability S. If the number N of slits is increased, then the leakage magnetic flux is increased to thereby increase the levitation force F, and also the fused metal can be supported at multiple points, so that the stability S can also be increased. Therefore, a design is preferable which can increase the number N of slits.

Figure 6D:
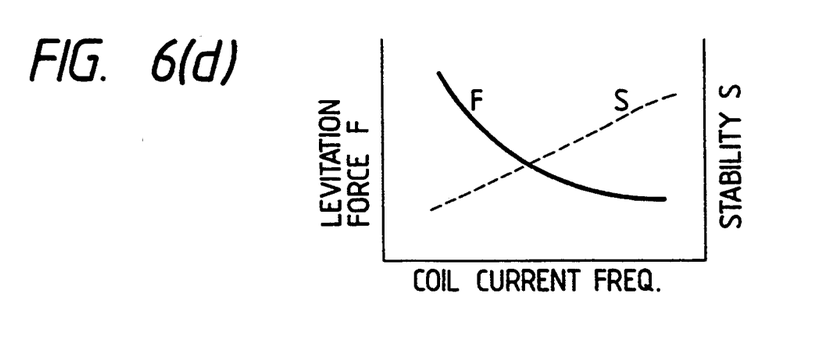

In this case, as shown in FIG. 6(d), if a frequency is low, then the leakage flux is increased, which is desirable from the viewpoint of heating and levitation force F, while a high frequency is preferable from the viewpoint of the stability S. For this reason, in order to balance the fused metal at the static pressure thereof, the slit formed in the bottom portion of the crucible is made wider so that the fused metal is able to receive a uniform force at various positions and thus the metal can be fused in a stable manner. A similar effect can also be obtained by optimizing the number of slits of the crucible, an exciting current, and a frequency in a split coil configuration to be described below. Since the tendency of the levitation force F is clearly shown in FIGS. 6(a) through 6(d), it seems that further description need not be given of FIGS. 9 to 12. However, in FIG. 11 which shows the case 3, there is reversed the tendency that the levitation force F is increased as the number of slits N is increased. This is because a reaction force between the eddy current of the fused metal due to a magnetic flux entering from the slit and a coil current does not provide a levitation force but provides a vector in a direction to press down the fused metal from above. Such reversal is due to the position of the coil.

Figure 5:
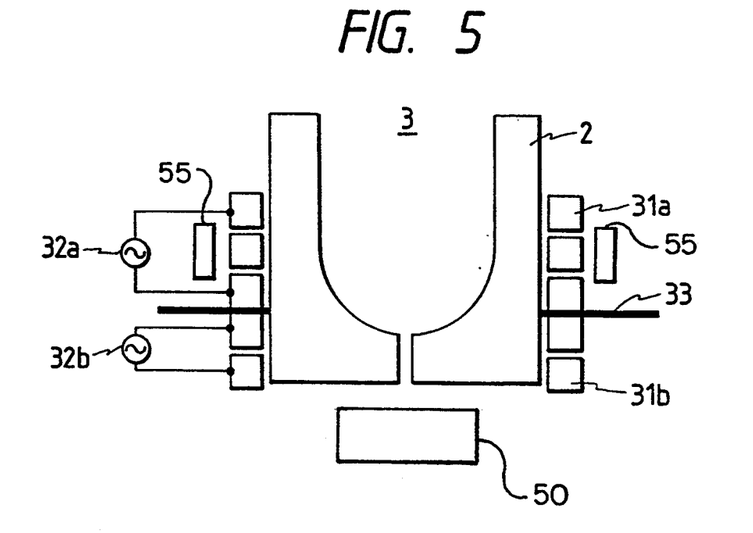
FIG. 5 is a sectional view of a levitating and fusing device according to a further embodiment of the invention.

FIG. 5 is a sectional view of a levitating and fusing device according to a third embodiment of the invention.

In the embodiment shown in FIG. 5, an induction coil, which is disposed in the outer periphery of the crucible 3 composed of the segments 2, is divided into a plurality of induction coils 31a, 31b to be excited by separate power sources 32a, 32b respectively having a variable frequency, and a magnetic shield plate 33 is interposed between the induction coils 31a and 31b. Referring to FIG. 6(d), if the crucible is operated at a low frequency so as to accelerate heating until a metal is fused and is then operated at a high frequency for stability after the metal is fused, then the metal can be fused with high efficiency. If the lower induction coil 31b is excited at a lower frequency or with a larger current, then the lower portion of the crucible is able to facilitate levitating and heating of the metal while the upper portion thereof is able to stabilize the fused metal. In this arrangement, a magnetic shield plate 33 serves as a magnetic shield between the induction coils 31a and 31b.

As shown at 50, if an inert gas such as argon or the like is allowed to enter the crucible 3 through the above-mentioned slits and to flow upwardly from the bottom of the crucible 3, then the inert gas can be blown uniformly, which facilitates the de-gassing of gasses such as hydrogen, oxygen, nitrogen and the like contained in the metal and also prevents the fused metal from reacting chemically with the components of the air. Since part of the fused metal will change into vapor and be scattered around in the ambient air to provide floating electrodes which produce insulation destruction, the coils and the like may be covered with a cover box formed of ceramics or the like so as to prevent the metal vapor from being attached to the coils and the like. The inert gas may be fed from the lower portion of the cover box. Also, if, in the outer peripheral portions of the above-mentioned induction coils 31a and 31b, there are arranged coils 55 to be excited by an alternating power, such as a well known three-phase alternating winding used in a stator of an induction machine and a synchronous machine, or there are arranged rotary magnetic field generation means such as permanent magnets or the like which are adapted to be able to rotate, then the fused metal can be stirred quite well and thus the composition of the fused metal can be made uniform.

As described above, the levitating and fusing devices according to the present inventions is constituted, as a common and basic portion, by a structure in which a crucible formed of a conductive material in a cylindrical shape having a bottom and disposed inside an induction coil is composed of a plurality of segments respectively divided through slits in the peripheral direction of the crucible and the leading ends of the bottom portions of the plurality of segments cooperate in defining an axial hole in the central portion of the crucible. The levitating and fusing device thus fundamentally organized is characterized by the following features.

That is, according to one aspect of the invention, the above slit formed in the bottom portion of the crucible can be made wider in width than a slit formed in the cylindrical portion of the crucible or the number of the slits in the bottom portion can be made greater the number of the slits in the cylindrical portion. Specifically, if the width is increased, then the levitating force F is increased while the stability is lowered. If the number of the slits is increased, then both the levitation force F and stability S are increased.

According to another aspect of the invention, the above-mentioned induction coil is excited by a power source the frequency of which can be varied. Thanks to this, a low frequency is used to facilitate the heating and fusing of a metal until the metal is fused and, after fused, a high frequency is used to be able to produce a fused metal which enjoys a high stability S.

According to still another aspect of the invention, the above-mentioned induction coil is divided into a plurality of coils to be excited by individual power sources. Due to this, if the lower induction coil is excited at a lower frequency or with a great current, then the lower portion of the crucible is able to accelerate levitating and heating of the metal while the upper portion thereof is able to stabilize the fused metal. In this case, a magnetic shield plate may be adapted to serve as a magnetic shield for the induction coils.

According to still another aspect of the invention, an inert gas is allowed to enter the crucible from the above-mentioned slits and to flow upwardly from the lower portion of the crucible. Thanks to this, the inert gas can be blown uniformly from the slits to thereby prevent the fused metal from chemically reacting with the components of the air.

According to still another aspect of the invention, there is arranged rotary magnetic field generation means, whereby the fused metal can be stirred very well and thus the composition of the fused metal can be made uniform.

What is claimed is:

1. A levitating and fusing device, comprising:
   an induction coil;
   a power source for exciting said induction coil; and
   a crucible disposed inside said induction coil and formed of a conductive material in a cylindrical shape with a bottom, the crucible holding a material to be charged for levitating and fusing, said crucible being formed of a plurality of segments respectively divided in a circumferential direction thereof by slits, each of said plurality of segments having a cylindrical portion and a bottom portion and including a leading end at the bottom portion thereof, said plurality of leading ends defining an axial hole in a central portion of said crucible,
   said slits formed in bottom portions of said segments being wider than slits formed in cylindrical portions of said segments.

2. A levitating and fusing device, comprising:
   an induction coil;
   a power source for exciting said induction coil; and
   a crucible disposed inside said induction coil and formed of a conductive material in a cylindrical shape with a bottom, the crucible holding a material to be charged for levitating and fusing, said crucible being formed of a plurality of segments respectively divided in a circumferential direction thereof by slits, each of said plurality of segments having a cylindrical portion and a bottom portion and including a leading end at the bottom portion thereof, said plurality of leading ends defining an axial hole in a central portion of said crucible, said slits formed in bottom portions of said segments being more numerous than slits formed in cylindrical portions of said segments.

3. A levitating and fusing device, comprising:
   upper and lower induction coils;
   separate power sources for exciting said upper and lower induction coils, respectively; and
   a crucible disposed inside said upper and lower induction coils and formed of a conductive material in a cylindrical shape with a bottom, the crucible holding a material to be charged, said material levitating in response to first magnetic flux from said lower induction coil and stabilizing in response to second magnetic flux from said upper induction coil, said crucible being formed of a plurality of segments respectively divided in a circumferential direction thereof by slits, each of said plurality of segments having a cylindrical portion and a bottom portion and including a leading end at the bottom portion thereof, said plurality of leading ends defining an axial hole in a central portion of said crucible.

4. A levitating and fusing device comprising:
   upper and lower induction coils;
   separate power sources for exciting said upper and lower induction coils, respectively; and
   a crucible disposed inside said upper and lower induction coils and formed of a conductive material in a cylindrical shape with a bottom, the crucible holding a material to be charged for levitating and fusing said crucible being formed of a plurality of segments respectively divided in a circumferential direction thereof by slits, each of said plurality of segments having a cylindrical portion and a bottom portion and including a leading end at the bottom portion thereof, said plurality of leading ends defining an axial hole in a central portion of said crucible; and
   a magnetic shield plate interposed between said upper and lower induction coils.

5. A levitating and fusing device as claimed in claim 3, wherein said lower induction coil is excited at a frequency lower than a frequency for said upper induction coil.

6. A levitating and fusing device, comprising:
   an induction coil;
   a power source for exciting said induction coil;
   a crucible disposed inside said induction coil and formed of a conductive material in a cylindrical shape with a bottom, the crucible holding a material to be charged for levitating and fusing, said crucible being formed of a plurality of segments respectively divided in a circumferential direction thereof by slits, each of said plurality of segments having a cylindrical portion and a bottom portion and including a leading end at the bottom portion thereof, said plurality of leading ends defining an axial hole in a central portion of said crucible; and
   means for removing ambient gas from said material by applying an inert gas into said crucible from said slits to flow upwardly from the bottom portion of said crucible.

7. A levitating and fusing device, comprising:
   an induction coil;
   a power source for exciting said induction coil;
   a crucible disposed inside said induction coil and formed of a conductive material in a cylindrical shape with a bottom, the crucible holding a material to be charged for levitating and fusing, said crucible being formed of a plurality of segments respectively divided in a circumferential direction thereof by slits, each of said plurality of segments having a cylindrical portion and a bottom portion and including a leading end at the bottom portion thereof, said plurality of leading ends defining an axial hole in a central portion of said crucible; and rotary magnetic field generation means disposed in the outer periphery of said crucible for stirring said material circumferentially.

8. A levitating and fusing device as claimed in claim 3, wherein said lower induction coil is excited at a current greater than a current for said upper induction coil.

9. A levitating and fusing device as claimed in claim 4, wherein said lower induction coil is excited at a frequency lower than a frequency for said upper induction coil.

10. A levitating and fusing device as claimed in claim 4, wherein said lower induction coil is excited at a current greater than a .current for said upper induction coil.

* * * * *